United States Patent [19]

Magnino, Jr. et al.

[11] 3,904,776

[45] Sept. 9, 1975

[54] METHOD OF FORMING A SHAPED HEAT SET FOOD ARTICLE

[75] Inventors: Pete Joseph Magnino, Jr., Plano, Tex.; William B. Burgess, St. Louis, Mo.; Richard R. Meyer, Brownsville, Tex.

[73] Assignee: Ralston Purina Company, St. Louis, Mo.

[22] Filed: Feb. 7, 1974

[21] Appl. No.: 440,436

Related U.S. Application Data

[63] Continuation-in-part of Ser. No. 258,095, May 30, 1972, abandoned.

[52] U.S. Cl. ............... 426/641; 426/643; 426/644; 426/656; 426/657; 426/513; 426/802
[51] Int. Cl.² ............................................. A23J 3/00
[58] Field of Search ........... 426/104, 137, 205, 272, 426/274, 276, 371, 364, 212

[56] References Cited
UNITED STATES PATENTS

| | | | |
|---|---|---|---|
| 2,785,009 | 3/1957 | Dudman | 426/272 |
| 3,644,121 | 2/1972 | Boyer et al. | 426/274 |
| 3,662,671 | 5/1972 | Frederiksen et al. | 426/205 |
| 3,662,672 | 5/1972 | Hoer | 426/205 |
| R27,790 | 10/1973 | Rusoff et al. | 426/205 |

*Primary Examiner*—Hyman Lord
*Attorney, Agent, or Firm*—Virgil B. Hill

[57] ABSTRACT

This invention relates to a new and improved structured food product formed of a heat setting edible synthetic protein fiber and to processes of forming food structures using a heat setting fiber. The particular food product of the invention provides a means of utilizing animal protein materials which have good nutritional properties but which lack sufficient structural integrity and texture to function as satisfactory food products.

5 Claims, No Drawings

METHOD OF FORMING A SHAPED HEAT SET FOOD ARTICLE

BACKGROUND OF THE INVENTION

This application is a continuation-in-part application of our previous application, Ser. No. 258,095 filed on May 30, 1972, now abandoned.

Edible protein fibers produced from secondary protein sources such as vegetable proteins, by-product proteins and microbial proteins are well known in the art. Typically these fibers have been used to supplement as well as replace primary sources of protein in the diet of humans as well as animals. A variety of processing techniques are employed to produce edible fibers from protein sources of this type, including a spinning process as characterized by U.S. Pat. No. 2,682,466, and an extrusion process as exemplified in U.S. Pat. No. 3,488,770. More recent protein fiber formation techniques include those which are described in U.S. Pat. No. 3,662,671 and U.S. Pat. No. 3,662,672. The processes characterized therein generally disclose the formation of heat settable protein fibers or filaments by the heating of a reactive slurry of the proteinaceous material in a heat exchange zone which is sufficient to produce the protein fibers. Typically the proteinaceous material is hydrated prior to introduction into the heat exchange zone to put it in a reactive state. The formed fibers and heat slurry are continuously removed from the heat exchange zone through an orifice into a collecting zone whereby the protein fibers are recovered.

Protein fibers produced by any of the above defined processing techniques have been considered as a valuable additive to primary protein materials such as meat, thereby extending the range of both the type as well as the amount of meat used in a formed meat product such as a meat pattie.

U.S. Pat. Nos. 3,644,121 and 3,482,998 define food products containing "spun" protein fibers as an extender while U.S. Pat. Nos. 3,662,671 and 3,662,672 also describe meat products containing protein fibers as an extender with the protein fibers being produced pursuant to the processing technique set out in these patents. The prior art as generally characterized by these patents, however, has recognized the necessity of adding an extraneous binder such as albumin, bread crumbs and the like to the meat together with the protein fibers in order to form a coherent food product and thereby retain the fibers in the food structure. The present invention obviates the need to add an extraneous binder in order to retain the fibers in the food structure, by using heat setting and self-binding protein fibers in the food system. These fibers upon heat setting stabilize and form a coherent food product without need for an added extraneous binder.

SUMMARY OF THE INVENTION

We have discovered a method of producing edible protein food products using edible synthetic secondary protein fiber which does not require the addition of supplemental binders or adhesives. The food substances produced by the present method are of an enhanced structural integrity and texture.

The great improvement in structure and texture achieved by the present method enables applicants to utilize a wide variety of protein sources to form structured foods. These protein sources are those which, though providing good quality protein and flavor, have heretofore been unacceptable due to their lack of sufficient texture. For example, many animal sources of protein are not fully utilized due to their lack of structure. Mechanically deboned flesh, i.e., fish, meat, poultry, provides a much higher yield in usable protein than other means of utilizing the flesh protein. This is particularly true of portions of the carcass which are not readily saleable, such as chicken necks and backs. Many species of "waste" or "trash" fish are not utilized as food sources because their flesh doesn't have sufficient structural integrity to withstand normal preparation and retain their texture.

We are able to impart texture and structural integrity to protein foods without using supplemental binders by using a heat setting and self-binding protein fiber in the food system. The food system is prepared by using fibers which are susceptible of producing a binding action in the presence of heat. The food product is first formed, using the heat setting fibers and then subjected to a heat treatment to set the protein fibers and other ingredients into a coherent structure. We have found that we can prepare structured food products having great structural integrity using supplemental protein sources which have been severely processed to the point that they have lost their adhesive and selfbinding properties, e.g., mechanically deboned flesh, by using heat settable fibers. The supplemental protein source need not be completely homogenized to be used in a food system, but may still retain some of its natural fibrous characteristics.

Although the following is not intended to be critical to the practice of the present invention, food products formed pursuant to the present invention preferably will incorporate from 5 to 60% by weight of the edible heat setting synthetic protein fibers. Typically, products produced pursuant to the present invention will preferably contain from about 5 to 60% of the heat setting fibers, from about 30 to 90% by weight of an additional food source, e.g., mechanically deboned chicken, "waste" fish, or by-product meat, and from about 0 to 6% supplemental flavors, spices, vitamins, minerals, etc. The relative percentage of ingredients in the food product is not intended to be critical since this will be dependent on the flavor, texture, or appearance of the product.

The food products are formed by blending the heat setting fibers and other ingredients and then heat setting the fibers to weld the fibers and other ingredients into a coherent structure. The heat treatment sets the heat settable fibers to a coherent structure and binds the fibers to each other and to the other ingredients in the formulation. The exact temperature employed is not critical to the practice of the present invention other than the temperature must be sufficient to heat set the fibers. We have found for example that internal temperatures of from about 120° to 250°F. for times of from about 3 to 120 minutes at temperature are preferred to heat set the fibers to the desired structural integrity. Suitable internal temperatures can be achieved by heating in an environment at a sufficiently high temperature and for a time sufficient to transfer enough heat to the product. In general, and as an example, environment temperatures of up to about 400° – 450°F. may be used. The heat setting operation may be a one step or multi-step operation.

DESCRIPTION OF THE PREFERRED EMBODIMENTS

We have found that if heat settable fibers prepared as described in U.S. Pat. Nos. 3,662,672 and 3,662,671 and U.S. Pat. application Ser. No. 98,009 filed Dec. 14, 1970 now abandoned are used, they will possess the desired heat setting and self-binding properties. The fibers may be utilized as described herein to form protein food structures without the addition of extraneous binders. Additional supplemental binders may be used with heat setting fibers if desired; however, they are not necessary to form coherent food structures and may even unduly toughen the food product. Food structures formed from heat setting fibers exhibit both improved structural integrity as well as texture. The improved structural integrity and texture provide the necessary characteristics which enable viable food products to be prepared from food sources which are nutritious and economical but which lack the requisite structure on cooking.

Forming the food product may be done by a variety of methods and the present invention is not intended to be limited in this respect. Typically, substantially all of the fibers are chopped into discrete particles of the desired length, preferably from about 0.125 to 1.0 inch with the exact length being dependent on the resultant texture of the food product. The particular length of the fibers is not intended in any manner to limit the operativeness of the present invention. The heat setting fibers are then mixed into a uniform mixture, with the additional protein source, if any, and any seasoning, flavoring and nutritional supplementation. This mixture can then be formed into any desired shape by hand, or more typically, by cold extrusion, i.e., sausage stuffer, and cutting. The material may also be rolled into balls, or into sheets which may be stamped or sawed into the desired shapes. The shaped articles may be breaded, coated with batter or further processed and then heat set. The heat setting may be performed by frying, baking, steaming, autoclaving or by other conventional cooking operations.

The following examples are illustrative of processes and structures embodying the invention.

EXAMPLE 1

A breaded fish stick containing 30% heat setting fiber and having a good texture and structural integrity was prepared from hake, a mechanically deboned trash fish as follows:

350 grams raw hake
150 grams heat setting fibers prepared as described in Example 1 of U.S. Pat. No. 3,662,672
10 grams salt The heat setting fibers were chopped to about ¼ inches in length on a food chopper and the hake, chopped fibers, and salt were added to a food mixer and mixed until blended. The mixture was formed into blocks by freezing under 25 psi pressure at −10°F. in a press pan. Fish sticks, ½ inch × ½ inch × 3 inches were sawed from the frozen blocks and breaded. The fish sticks prepared as above were deep fried at 375°F. for 5 minutes to raise the product to temperature. The product heat set during cooking into a coherent structure. The structure and texture of the fish sticks prepared as above were compared with a commercial product and with fish sticks prepared from hake only. The hake only fish sticks were unacceptable in texture and structure. The product was mushy and had no structural integrity. The commercial product remained intact but was mushy and didn't have the good bite and chew of the product of the invention.

EXAMPLE 2

A structured product containing 35% heat setting fiber was prepared from mechanically deboned chicken meat (necks and backs) as follows:

126 grams deboned necks and backs
70 grams heat setting fibers
2 grams flavor
2 grams salt The heat setting fibers were chopped and the ingredients mixed as described in Example 1. The mixture was molded around a rod, breaded, partially heat set in a 350°F. oven for 10 minutes, and deep fried at 350°F. for 5 minutes to form the final product. The product exhibited good texture, was structurally sound and resembled a chicken drumstick in organoleptic characteristics. Heat set mechanically deboned chicken necks and backs had almost no textural and structural integrity.

EXAMPLE 3

Chicken soup chunks containing 55% heat setting fiber were prepared from mechanically deboned necks and backs and heat settable protein fibers as follows:

83 grams of deboned necks and backs
110 grams of heat setting protein fibers
2 grams salt
10 grams imitation chicken flavor and spices The fibers were chopped and mixed as described in Example 1. The mixture was molded and heat set in a water bath at 170°F. for 4 hours in a spring loaded pan. The cooked structure was freed from the mold and chopped into ½ inch cubes. The cubes were retorted in chicken broth at 250°F. for 150 minutes. The retorted cubes exhibited chew and texture characteristics similar to cubed chicken breast. The cubes were used to prepare a conventional chicken noodle soup and retained their structural integrity and texture. Molded deboned chicken necks and backs had almost no texture and structural integrity and could not be formed into coherent cubes. The molded deboned necks and backs disintegrated substantially when used as soup chunks.

EXAMPLE 4

A chicken soup chunk containing 25% heat setting fiber was prepared as follows:

50 grams heat settable fiber
143 grams mechanically deboned chicken necks and backs
2 grams salt
5 grams imitation chicken flavor and spices The ingredients were prepared and mixed as described in Example 1. The mixture was molded as described in Example 3 and heat set at 170°F. for 4 hours as described in Example 3. The molded mixture was chopped into ½ inch cubes. The cubes were judged equal to those in Example 3 and performed very well in a commercial chicken noodle soup formulation.

EXAMPLE 5

A meat replacing soup chunk was formulated wholly from heat settable protein fibers as the protein source as follows:

500 grams heat settable fibers
10 grams imitation chicken flavor
10 grams spices
5 grams hydrolyzed vegetable protein
5 grams salt The fibers were chopped as described in Example 1 and mixed with the other ingredients as described in Example 1. The mixed material was molded, heat set at 350°F. for 20 minutes in an oven and cubed as described in Example 3. The cubed material had a taste, texture and appearance similar to chicken breast meat.

The product had good structural integrity and remained intact when squeezed. The cubed material was used as a replacement for all of the chicken in a commercial chicken noodle soup. The soup was canned and retorted at 250°F. for 150 minutes. The retorted soup was cooled and opened. The cubed product was found to have retained its structure and texture. The retorted soup was simmered for 15 minutes and eaten hot. The flavor and texture of the chunks was similar to chicken breast chunks. The cubed material retained its organoleptic properties and remained intact. The cubed material was judged to be a quite satisfactory substitute for chicken in soup formulations.

EXAMPLE 6

A structured tuna product, suitable for use in fish cakes or salads and containing 50% heat setting fiber and having good texture and structural integrity, was prepared from tuna by-product fines (cannery wastes) as follows:

250 grams raw tuna cannery waste
250 grams heat setting fibers chopped to about ¼ inch in length as described in Example 1 where mixed in a commercial food mixer until uniformly blended. The mixture was blended until uniformly blended (about 10 – 15 minutes).
180 grams of the mixture was placed in a 307 by 113 can and 10 cc's vegetable extract.
1 ½ grams of salt was added.

Vegetable oil was added to fill the can to the brim. The can was sealed and retorted at 15 psi (250°F.) for 55 minutes to bring the product up to temperature and heat set the fibers. The cans were cooled and opened. The mixture of heat settable fibers and fish had set to form a solid plug having structure and texture similar to deboned tuna loin. The product could be used to prepare tuna salad or tuna cakes as a complete replacement for 100% tuna loin.

EXAMPLE 7

A structured tuna product containing 20% heat setting fibers was prepared by the method of Example 6 by using 200 grams heat settable fibers and 800 grams tuna by-product fines. The fibers and tuna by-product fines were blended, molded and heat set as described in Example 6. The finished product had good texture and structural integrity and could be used as a complete replacement for tuna loin meat in tuna salads, tuna cakes or other tuna dishes.

EXAMPLE 8

The structured shrimp product suitable for use in salads or fish cakes containing 30% by weight heat setting fibers and having good texture and structural integrity was prepared from 350 grams peeled shrimp
150 grams heat setting fibers, and
12 grams of salt The whole peeled shrimp were chopped with the salt for 15 seconds on a commercial food chopper. The fibers were chopped on a commercial food chopper to a length of about ¼ inch. The chopped fibers and chopped shrimp were blended for about one minute in a commercial food mixer to form a uniform mix. The mixed materials were shaped into patties, battered, and breaded with a commercial breading mixture and prefried at 350°F. for 60 seconds. The prefried patties were frozen and were later reconstituted and set by baking in an oven at 400°F. for 20 minutes to bring the product up to temperature. The cooked final product had good mouthfeel, bite and texture and structural integrity. The bite had the rubbery characteristic similar to whole cooked shrimp and the product could be used to prepare salads or as a replacement for shrimp cakes made of 100% shrimp.

The spirit and scope of our invention is not restricted to the above examples, but it is intended to be limited only by the following claims and their reasonable equivalents.

We claim:

1. The method of forming a shaped heat set food article in the absence of extraneous binders comprising: forming heat settable protein fibers by heating a reactive slurry of proteinaceous material in a heat exchange zone sufficient to produce the protein fibers and continuously removing the heated slurry and protein fibers from the zone through an orifice to a collecting zone whereby the protein fibers are recovered, chopping the heat settable fibers into discrete particles substantially all of which are from about 0.125 to 1.0 inches long, blending the chopped fibers with edible animal tissue, to form a substantially uniform mixture which consists essentially of between about 5 and 60% by weight of the heat settable protein fibers, between about 30 and 90% by weight of edible animal tissue, flavoring materials and seasoning, forming the mixture into shaped pieces, followed by heat setting of the shaped pieces by heating to an internal temperature of between about 120° and 250°F to heat set the fibers.

2. The method of claim 1 wherein the fibers are heat set for a period of time between about 3 and 120 minutes.

3. The method of forming a shaped, heat set, fish food article in the absence of extraneous binders comprising: forming heat settable protein fibers by heating a reactive slurry of proteinaceous material in a heat exchange zone sufficient to produce the protein fibers and continuously removing the heated slurry and protein fibers from the zone through an orifice to a collecting zone whereby the protein fibers are recovered, chopping the heat settable fibers into discrete particles substantially all of which are from about 0.125 to 1.0 inches long, blending the chopped fibers with raw fish flesh, to form a substantially uniform mixture consisting essentially of between about 5 and 60% by weight of heat settable protein fibers, between about 30 and 90% by weight of raw fish flesh, and seasoning and flavoring materials, forming the mixture into shaped pieces, and heat setting the shaped pieces into coherent food articles of good structural integrity by heating the shaped pieces to an internal temperature of between about 120 and 250°F. to heat set the fibers.

4. The method of claim 3 wherein said shaped pieces are breaded prior to being heat set.

5. The method of forming a shaped heat set chicken food article in the absence of extraneous binders comprising: forming heat settable protein fibers by heating a reactive slurry of proteinaceous material in a heat exchange zone sufficient to produce the protein fibers and continuously removing the heated slurry and protein fibers from the zone through an orifice to a collecting zone whereby the protein fibers are recovered, chopping the heat settable fibers into discrete particles substantially all of which are from about 0.125 to 1.0 inches long, blending the chopped fibers with deboned chicken flesh, to form a substantially uniform mixture which consists essentially of between about 5 and 60% by weight of the heat settable protein fibers, between about 30 and 90% by weight of chicken flesh, flavoring materials and seasoning, forming the mixture into shaped pieces, followed by heat setting of the shaped pieces by heating to an internal temperature of between about 120° and 250°F. to heat set the fibers.

* * * * *